April 7, 1959     A. J. TOLOMEO ET AL     2,880,810
BLADE POSITIONER

Filed March 3, 1955     3 Sheets-Sheet 1

INVENTORS
A. J. TOLOMEO
L. J. DiBATTISTA
RICHARD SMITH
BY     ATTORNEY

April 7, 1959  A. J. TOLOMEO ET AL  2,880,810
BLADE POSITIONER

Filed March 3, 1955  3 Sheets-Sheet 2

INVENTORS
A. J. TOLOMEO
L. J. DiBATTISTA
RICHARD SMITH
BY M. B. Tasker
ATTORNEY

United States Patent Office 2,880,810
Patented Apr. 7, 1959

2,880,810

BLADE POSITIONER

Albert J. Tolomeo, Stratford, and Liberto J. Di Battista and Richard Smith, Milford, Conn., assignors to United Aircraft Corporation, East Hartford, Conn., a corporation of Delaware Application March 3, 1955, Serial No. 491,886

19 Claims. (Cl. 170—160.37)

This invention relates to rotary wing aircraft, such as helicopters, which have at least one sustaining rotor that is rotatable about an upright axis. These aircraft have rotor blades of such great length that in order to get the aircraft into a hangar or into the elevator of an aircraft carrier, it is necessary to turn the rotor until its blade is extended over the fuselage. If the rotor has more than one blade, one of its blades is selected to be the master, or index, blade to be positioned over the fuselage and the other blades are subsequently folded.

It is an object of this invention to provide improved means and an improved method for automatically positioning the rotor head of such aircraft so that a blade extends over the fuselage and for holding the rotor in this position during any subsequent folding of the blades.

A further object of the invention is to provide hydraulic means and controls therefor for rotating the rotor head and for braking the same to bring it to rest accurately in the desired position of the index blade.

Due to the great inertia of the moving rotor head it is difficult to stop it at the exact position required and, consequently, another object of the invention is to provide means for reversely rotating the rotor head upon overtravel of the same to bring it back and stop it in the desired position.

A yet further object of the invention is to provide automatic means for indexing the rotor head of a rotary wing aircraft.

These and other objects of the invention will be more fully set forth in the following detailed description of one embodiment of the invention shown in the accompany drawings.

In these drawings, Fig. 1 is a side elevation of a helicopter embodying the invention, parts of the fuselage being broken away;

Figure 1:
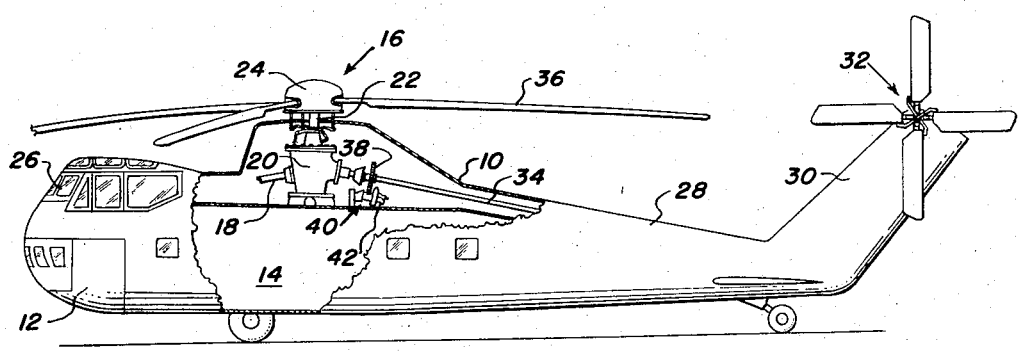

The helicopter shown in Fig. 1 includes a fuselage 10 having a forward engine compartment 12 and a central passenger or cargo compartment 14 directly beneath the single sustaining rotor 16. An engine, not shown, rotates a drive shaft 18 which extends obliquely aft into a gear box 20 from which a main rotor drive shaft 22 extends upwardly and carries the rotor head 24 of the main rotor.

A pilot compartment 26 is located above the cargo compartment and a tail cone 28 extends aft and terminates in an upwardly directed tail rotor pylon 30 which carries the usual anti-torque tail rotor 32 rotatable about a generally horizontal axis. The tail rotor is driven by a rearwardly extended drive shaft 34 which extends aft from the gear box 20 through the tail cone 28 and the pylon 30.

In the helicopter shown the rotor head 24 is provided with a plurality of rotor blades 36, the particular helicopter illustrated having five such blades. For an understanding of this invention, however, the number of blades is immaterial since only one of the blades need be considered. This blade, which is referred to as the master blade, or sometimes as the index blade, is positioned directly aft over the tail cone 28 and the rotor head is held in this position during the subsequent folding of the other blades. The blade folding mechanism of this helicopter is described and claimed in a co-pending application Serial No. 459,705, filed October 1, 1954 and assigned to the assignee of this application.

The present invention is concerned with automatically operated hydraulic means and its control mechanism for rotating the rotor head into a position in which the index blade is directly over the tail cone and for holding it in this position while the blades are being folded.

It will be noted from Fig. 1 that the tail rotor drive shaft 34 is driven from the gear box 20 and, accordingly, for the purpose of rotating the main rotor head 24 into position for folding the blades an enlarged diameter gear 38 is fixed to the tail rotor shaft 34. This gear is driven by hydraulic motor assembly generally indicated in Figs. 1 and 2 by the numeral 40.

Figure 2:
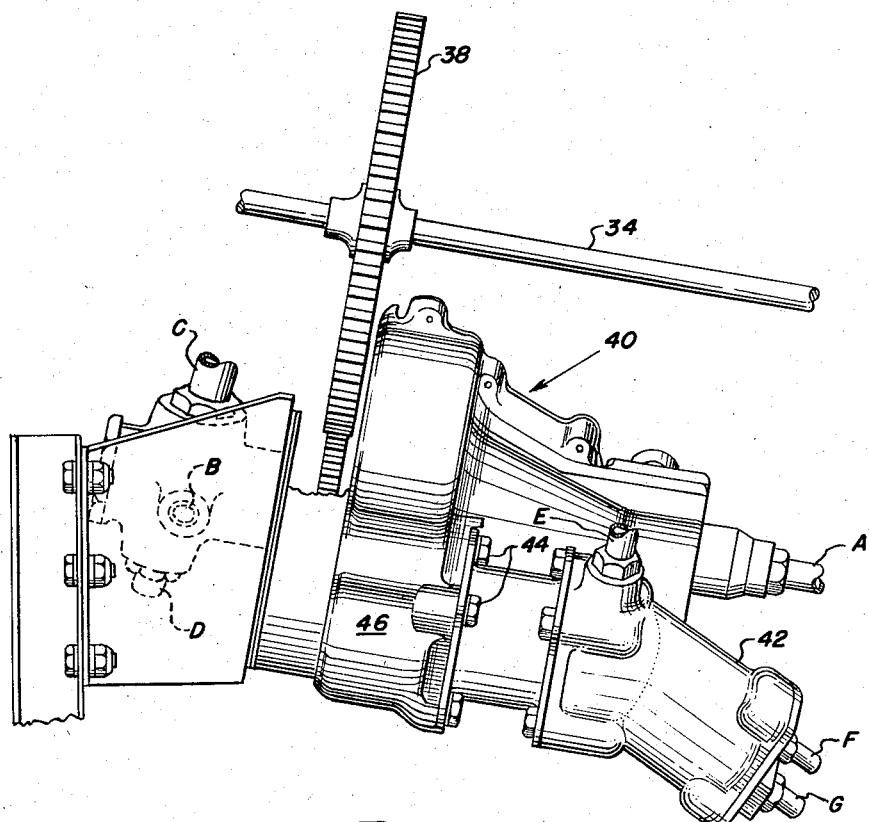
Fig. 2 is an enlarged view of the hydraulic rotor driving mechanism of Fig. 1.

The hydraulic motor assembly 40 includes a reversible hydraulic motor 42 having fluid connections F and G and a drain connection E (Fig. 2). The motor, which may be of any well-known type, such as a constant displacement motor, is secured by cap screws 44 to a somewhat U-shaped housing 46 of a hydraulic motor control mechanism generally indicated by the numeral 48 (Fig. 4) which has left and right-hand axially aligned cylindrical bosses 49 and 50 comprising the support for the hydraulic control mechanism for motor 42.

Figure 4:
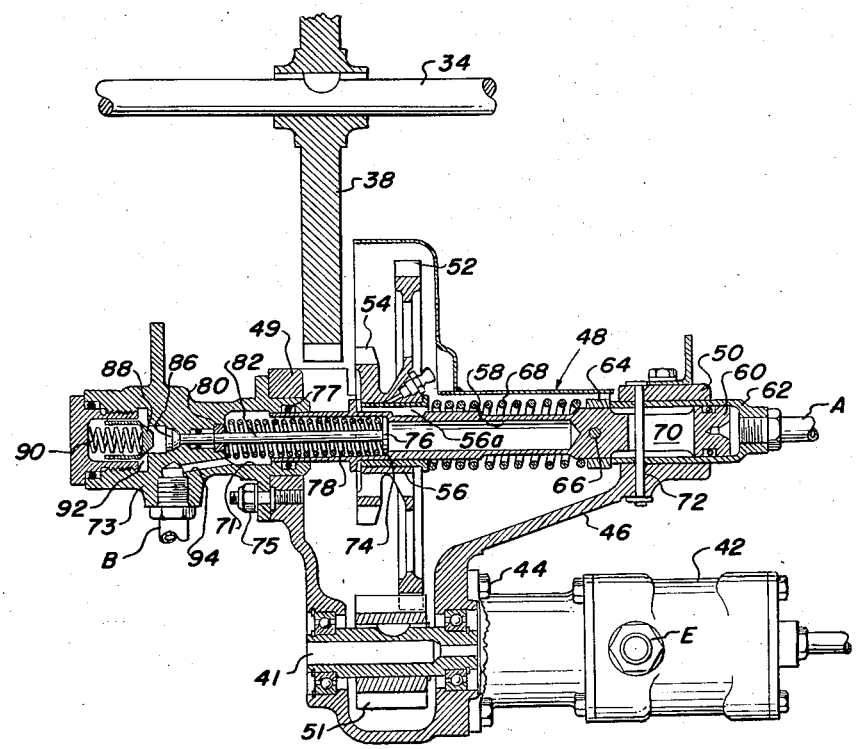
Fig. 4 is a sectional view taken on line 4—4 of Fig. 3.

The drive shaft 41 of motor 42 carries an elongated pinion 51 which drives a relatively large diameter gear 52 and its integral pinion 54 which are rotatably mounted in casing 46 on a flanged bushing 56 (Fig. 4). Bushing 56 is fixed against rotation on a hollow piston rod 58 by a key 56a which is slidable in a keyway in the bushing 56. The piston rod 58 has an integral piston 60 which is reciprocable in a cylinder 62 fixed in the right-hand boss 50 of casing 46. Piston 60 has an external collar 64 secured thereto by a pin 66 and a compression spring 68 which surrounds the piston rod 58 bears at one end against collar 64 and constantly urges the collar against the lefthand end of cylinder 62. At its other end spring 68 bears against the adjacent flange of bushing 56. A longitudinal slot 70 is provided in piston 60 in a central portion of reduced diameter through which a pin 72 in boss 50 extends.

The purpose of this pin is to secure cylinder 62 in boss 50 and also to prevent rotation of the piston, its piston rod extension and flanged bushing 56 on which gears 52, 54 are journalled. The left-hand end of piston rod 58 is guided in an axially aligned chamber 71 of a ported fitting 73 which is secured by studs and nuts 75 to boss 49, a suitable fluid seal 77 being provided at this point.

The extreme end of the piston rod extension has an enlarged bore terminating in a shoulder 74 against which is seated a washer 76. A spring 78 bears at one end against the washer 76 and at its other end bears against a bearing washer 80 supported by a shoulder in chamber 71. An axial valve operating rod 82 extends through the spring 78 and is secured at its right-hand end to washer 76. The rod 82 extends through bearing washer 80 and into a valve chamber in fitting 73 where it terminates in an enlarged end 86 adapted to engage a valve 88 and move the same against its spring 90 off its seat 92 whenever the piston 60 is moved to the left in Fig. 4. Hydraulic fluid is admitted at fitting A into the cylinder 62 to move piston 60 to the left and move the pinion 54 into engagement with the gear 38. In the event that the teeth of the gears do not immediately mesh, it will be evident that the spring 68 will be compressed and the gear 54 will move into mesh immediately upon rotation of the gear 54 by the hydraulic motor 42.

Figure 3:
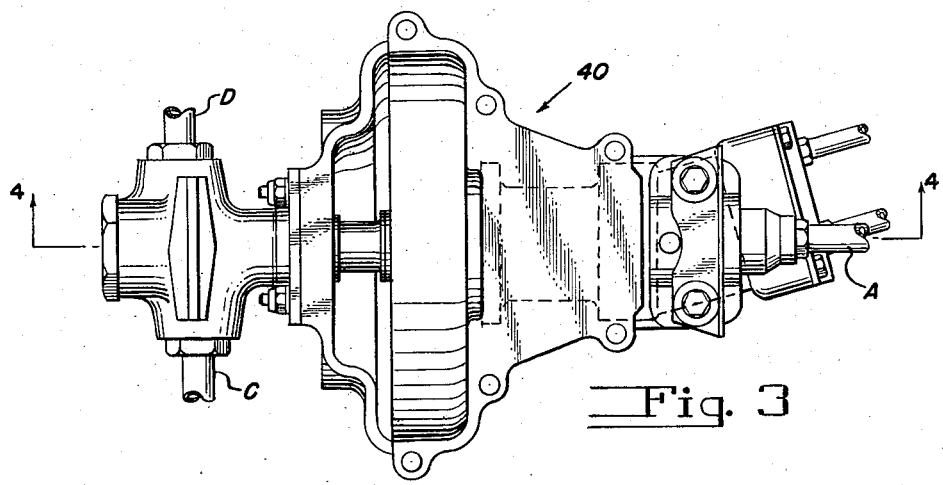
Fig. 3 is a plan view of the hydraulic mechanism of Fig. 2.

As piston 60 moves to the left in Fig. 4, it also compresses spring 78 and urges rod 82 to the left to unseat the valve 88. This valve controls fluid entering at fitting D under pressure and leaving fitting C (Fig. 3) which supplies fluid to the motor 42 as will be hereinafter more fully explained.

As piston 60 moves to the left, fluid is vented from the left-hand side of the piston as viewed in Fig. 4 through a passage 94 and leaves the casing 46 through fitting B. While piston 60 is constantly biased by spring 68 into the position shown in Fig. 4 in which gears 54 and 38 are out of engagement, under certain conditions of operation, pressure fluid is admitted to fitting B to insure the positive disengagement of these gears. Then fluid on the right-hand side of piston 60 is discharged through fitting A, as will be pointed out more fully in connection with the description of operation of the system as shown in Fig. 5.

Figure 5:
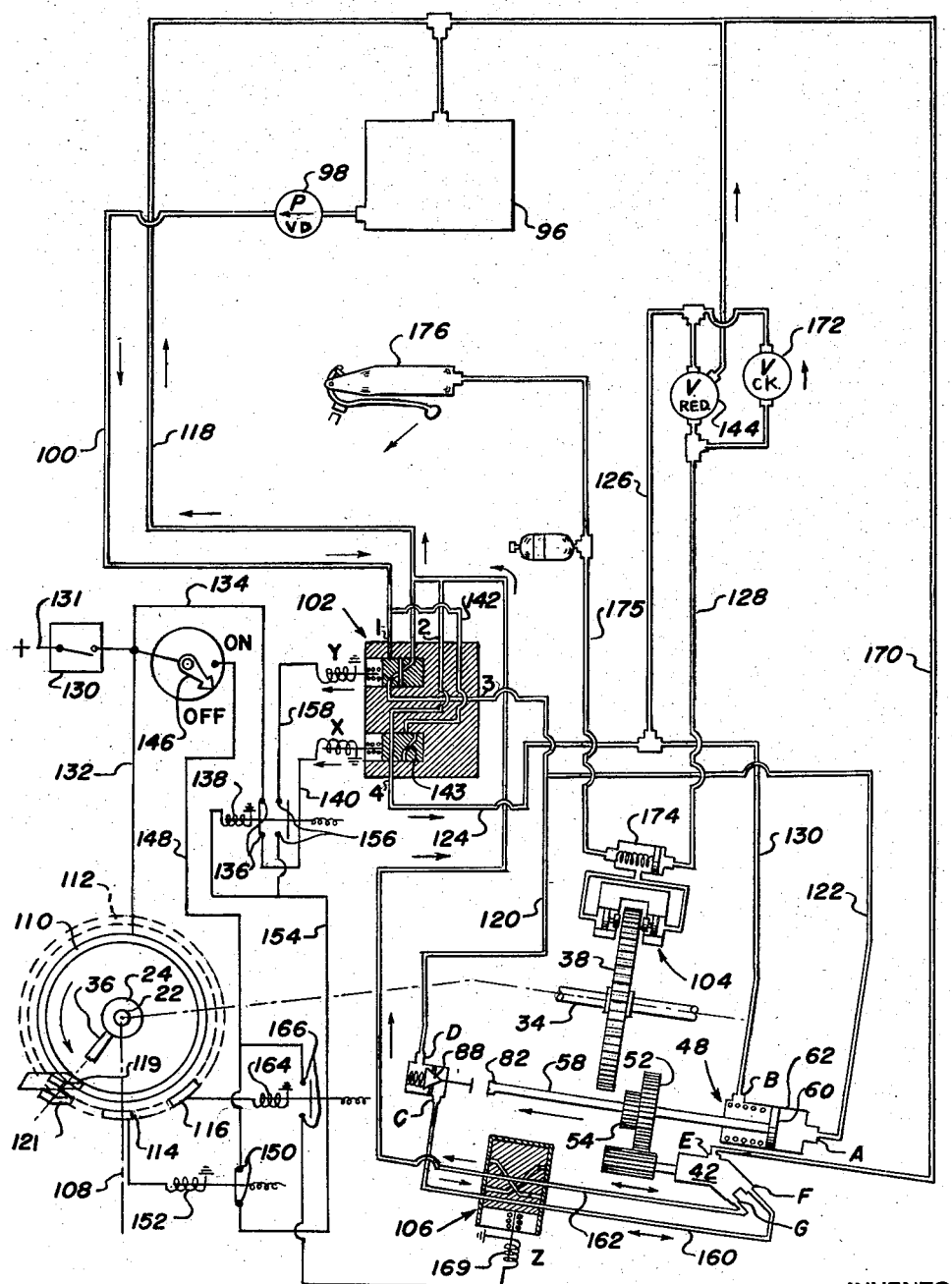
Fig. 5 is a schematic diagram illustrating the operation of the hydraulic mechanism and the electrical controls therefor.

Referring to Fig. 5, it will be noted that the hydraulic system includes a fluid sump 96 from which fluid is taken by a pump 98 and discharged through a conduit 100 to a double valve mechanism 102 controlled by solenoid valves $x$ and $y$. The valve mechanism 102 under the control of the solenoids directs fluid to a fluid brake mechanism 104 which frictionally engages the rim of gear 38. Fluid is also supplied to the hydraulic control mechanism 48 wherein valve 88 controls the flow of fluid to a reversing valve 106 controlled by a solenoid valve $z$ which reverses the direction of rotation of motor 42. The three solenoid valves $x$, $y$ and $z$ are all two position valves and when deenergized are biased into a normal position by springs.

Also, as shown in Fig. 5, the main rotor drive shaft 22 drives the rotor hub 24 which supports the rotor blades, only one blade 36 being shown which is the index blade. When the index blade has been rotated so that it lies directly aft of the fuselage and over the longitudinal centerline 108 of the fuselage the rotor is then in the position in which it is desired to hold it during subsequent folding of the blades. Also, as shown in this figure, slip rings 110 and 112 are provided which are carried by fixed structure of the main rotor pylon. The inner ring 110 is a continuous annular conductor, whereas the ring 112 has a relatively short conducting portion 114 located at the longitudinal centerline 108 of the fuselage and a somewhat longer conducting portion 116 slightly beyond the portion 114. A jumper is also provided which rotates with the rotor head and has electrically connected contacts 119 and 121. As shown in Fig. 5, contact 119 is constantly in engagement with slip ring 110 and contact 121 engages ring 112 in position to contact portions 114 and 116 successively as the rotor is driven in the direction of the arrow in Fig. 5 by the hydraulic motor 42.

As shown in Fig. 5, the parts are in their normal position, such as would be the case if the helicopter had landed on a carrier deck and the rotor had just come to rest with the index blade 36 in the angular position shown. Under these conditions in which solenoid valves $x$ and $y$ are de-energized, port 3 of valve mechanism 102 is connected through solenoid valve $y$ with fluid return conduit 118 so that conduit 120 which supplies motor 42 with fluid is connected to sump 96. Also, conduit 122 which supplies fluid to fitting A at the right-hand end of cylinder 62 is also connected to sump 96. Port 4 of valve mechanism 102 is also connected through solenoid valve $x$ to drain conduit 118. This connects conduits 124, 126 and 128 leading to brake 104 with sump 96. At the same time, conduit 130 leading to the left-hand side of cylinder 62 is also connected to sump 96.

If now the pilot closes switch 130, current flows from power source 131 through switch 130 and conductor 132 to slip ring 110. Current also flows through conductor 134, contacts 136 of solenoid relay 138, conductor 140 and solenoid of valve $x$ to ground to energize the latter valve and move it against its biasing springs in the direction of the arrow. This connects the fluid pressure line 100 through conduit 142 and passage 143 of solenoid valve $x$ to port 4 of valve mechanism 102, supplying fluid under pressure through conduits 124, 126, reducing valve 144 and conduit 128 to apply hydraulic brake 104 which holds the rotor against movement. At the same time fluid is supplied through conduit 130 to fitting B of the hydraulic motor control mechanism 48 admitting fluid under pressure to cylinder 62 on the left-hand side of piston 60, insuring that pinion 54 is disengaged from gear 38. Everything else in the system is connected with sump 96. The helicopter can be left in this condition indefinitely with the rotor locked against rotation if the pilot does not desire to fold the blades. If he desires to fold the blades, he must first index the rotor head.

To index the rotor head the pilot moves the switch 146 to its "on" position which establishes a circuit through conductor 148, contacts 150 of relay 152, conductor 154, through the solenoid of relay 138 resulting in opening contacts 136 and closing contacts 156 of this relay. This results in opening the circuit through the solenoid of valve $x$ and closing a circuit through the solenoid of valve $y$ from conductor 154 through contacts 156 and conductor 158. As a result of de-energizing solenoid valve $x$ and energizing solenoid valve $y$, thereby moving valve $y$ in the direction of the arrow, fluid pressure conduit 100 is connected through valve $y$ to port 3, supplying pressure fluid through conduit 120 to fitting D of hydraulic control mechanism 48. At the same time pressure fluid is supplied through conduit 122 to fitting A which forces piston 60 to the left to engage pinion 54 with gear 38. Whether or not these gears immediately mesh, the piston extension 58 causes the plunger 82 (Fig. 4) to engage valve 88 and force it off its seat. Fluid is now supplied from fitting C through conduit 160 to fitting F of hydraulic motor 42 causing the latter to rotate in a forward direction. Gears 54 and 38 will engage, if they have not already done so, under the action of spring 68. At the same time fluid from the motor 42 returns through fitting G and conduits 162 and 118 to the sump. Port 4 of valve 102 is connected to drain conduit 118 due to the de-energizing of solenoid valve $x$ so that the brake 104 is now off.

The rotor will continue to be driven in the direction of the arrow in Fig. 5 until contact 121 of the jumper engages conducting portion 114 of the outer slip ring. A circuit is then established through conductors 132, ring 110, contacts 119, 121, 114 and solenoid 152 to ground, causing the relay of solenoid 152 to open its contacts 150. This results in breaking the previously established circuit through the solenoid of relay 138. As a result, contacts 136 are closed and contacts 156 are opened. Consequently, valve $x$ is again energized while $y$ is de-energized. This returns the system to the previous condition in which the brake is applied and the piston 60 is urged to the right by fluid entering fitting B to positively disengage pinion 54 and gear 38.

Since the positioning of the index blade on line 108 is quite critical, the conducting portion 114 is short. If wind conditions are favorable and the rotor head does not have too much inertia when contact 121 engages 114 the rotor may stop with 121 and 114 in contact.

In this position of the parts the index blade 36 is positioned directly over the longitudinal axis 108 of the fuselage and the pilot can initiate the next operation of folding the blades.

However, as is frequently the case, the rotor may have so much inertia that contact 121 will overtravel contact 114 which, as previously pointed out, must be very short. The instant jumper contact 121 leaves contact portion 114, solenoid 152 is de-energized, closing contacts 150 which re-establishes the circuit through solenoid 138 and causes solenoid valve x to be de-energized and solenoid valve y to be energized. The motor control mechanism 48 will be supplied with fluid at fitting A and will connect motor 42 to drive the rotor by moving pinion 54 into mesh with gear 38. This axial movement of piston extension 58 will be supplied to motor 42 to again rotate the rotor in a counterclockwise direction. Jumper contact 121 almost immediately engages contact portion 116 which causes solenoid 164 to be energized and close its contacts 166. This results in establishing a circuit through conductor 148, contacts 166, conductor 168 and the solenoid 169 of solenoid valve z, reversing the flow of hydraulic fluid in conduits 160 and 162 so that the motor 42 reverses and drives the rotor clockwise as long as the contacts 121 and 116 are in engagement. When this engagement is broken contact 121 again engages contact 114. This results, as before, in energizing relay 152 and opening its contacts 150, causing solenoid y to be de-energized and x to be energized. It will be recalled that under these conditions the brake is applied and piston 60 is urged in a direction to disengage pinion 54 and gear 38. This time the rotor will stop in the desired indexed position because in its counterclockwise movement it will have moved so short a distance that it will not have enough momentum to overtravel contact 114 but will have, however, sufficient momentum to carry it over to contact 114 from contact 116.

Certain details of the system which have not been described but which are desirable include a vent conduit 170 which connects the fitting E of the hydraulic motor with drain to take care of any leakage fluid which may accumulated in the motor casing. Also, because the reducing valve 144 cannot be relied upon to permit venting of the brake, a check valve 172 is provided which shunts the reducing valve. It will also be noted that a spring pressed shuttle valve 174 is provided in conduit 128 which yields when pressure is supplied through conduit 128 to apply the brake. The purpose of this shuttle valve is to automatically close off conduit 128 and allow the brake to be applied by creating pressure in conduit 175 upon operation of the manual pump 176 in the event of failure of the hydraulic system.

It will be evident that as a result of this invention automatic means have been provided for indexing a rotor head accurately into the rather critical position which it must occupy in order to safely fold the blades. Further, it will be evident that reliable means has been provided for controlling the mechanism throughout the indexing operation and for holding the rotor head during the subsequent blade folding operation.

While the invention has been described in connection with a preferred embodiment thereof, it will be obvious that numerous changes in the construction and arrangement of the parts may be resorted to without departing from the scope of the invention.

We claim:

1. In a rotary wing aircraft, a fuselage, a sustaining rotor having at least one blade, indexing mechanism for said rotor including power operated means for driving said rotor, brake means for stopping said rotor, and control mechanism for said rotor driving means and said brake means for automatically disconnecting said driving means and applying said brake means when said blade has been rotated into a predetermined position relative to said fuselage.

2. In a rotary wing aircraft, an elongated fuselage, a sustaining rotor adjacent one end of said fuselage having an index blade, indexing mechanism for rotating said rotor including a motor, means for connecting said motor and said rotor, brake means for holding said rotor against rotation in any position, control means for releasing said brake means, energizing said motor and connecting said motor with said rotor to rotate the latter, and means responsive to the position of said rotor for actuating said control means to apply said brake, disconnect said motor and de-energize the latter when said index blade lies over and aligned with the longitudinal axis of said fuselage.

3. In a rotary wing aircraft, a rotor having a plurality of blades, one of which is an index blade, contact means rotatable with said rotor, slip ring means on stationary structure of said aircraft including contact means engageable by said rotatable contact means when said index blade is in a predetermined position, motor means for rotating said rotor, means for connecting said motor to drive said rotor and for disconnecting the same, brake means for stopping said rotor, electrical relay means for connecting said rotor driving means and releasing said brake, means for energizing said electrical relay means when said rotatable contact means is out of engagement with said stationary contact means, second electrical relay means for disconnecting said motor from said rotor and applying said brake, and means for energizing said second electrical relay means when said rotatable contact means is in engagement with said stationary contact means.

4. In a rotary wing aircraft, a rotor having a plurality of blades, one of which is an index blade, contact means rotatable with said rotor, slip ring means on stationary structure of said aircraft including contact means engageable by said rotatable contact means when said index blade is in a predetermined position, motor means for rotating said rotor, means for connecting said motor to drive said rotor and for disconnecting the same, brake means for stopping said rotor, electrical relay means for connecting said rotor driving means and releasing said brake, means for energizing said electrical relay means when said rotatable contact means is out of engagement with said stationary contact means, second electrical relay means for disconnecting said motor from said rotor and applying said brake, means for energizing said second electrical relay means when said rotatable contact means is in engagement with said stationary contact means, means for reversing the direction of rotation of said motor, a second stationary contact means adjacent said first contact means, third electrical relay means for actuating said reversing means, and means for energizing said third electrical relay means when said rotary contact means is in engagement with said second stationary contact means.

5. In a rotary wing aircraft, a rotor having a plurality of blades, one of which is an index blade, contact means rotatable with said rotor, slip ring means on stationary structure of said aircraft including a contact engageable by said rotatable contact means when said index blade is in a predetermined position, hydraulic motor means for rotating said rotor, hydraulically actuated means for connecting said motor to drive said rotor and for disconnecting the same, hydraulic brake means for stopping said rotor, and electric relay means for supplying hydraulic fluid to said motor, releasing said brake and actuating said motor connecting means, means for energizing said electrical relay means when said rotatable contact means is out of engagement with said stationary contact and second electrical relay means for actuating said hydraulic means to disconnect said rotor drive means, cut off the supply of fluid to said motor and apply said brake, and means for energizing said second electrical relay means when said rotatable contact means is in engagement with said stationary contact.

6. In a rotary wing aircraft, a rotor having a plurality of blades, one of which is an index blade, contact means rotatable with said rotor, slip ring means on stationary structure of said aircraft including a contact engageable by said rotatable contact means when said index blade is in a predetermined position, hydraulic motor means for rotating said rotor, hydraulically actuated means for connecting said motor to drive said rotor and for disconnecting the same, hydraulic brake means for stopping said rotor in said predetermined position of said index blade, first electric relay means for supplying hydraulic fluid to said motor, releasing said brake and actuating said motor connecting means, means for energizing said first electrical relay means when said rotatable contact means is out of engagement with said stationary contact, second electrical relay means for actuating said hydraulic means to disconnect said rotor drive means, cut off the supply of fluid to said motor and apply said brake, means for energizing said second electrical relay means when said rotatable contact is in engagement with said stationary contact valve means for reversing the direction of rotation of said motor, a second contact on said stationary slip ring means adjacent said first mentioned contact, a third electrical relay means for actuating said motor reversing valve means, and means for energizing said third electrical relay means when said rotary contact means is in engagement with said second stationary contact.

7. Mechanism for driving the rotor of a rotary wing aircraft to position the blades for folding including a rotor driving gear, a shaft having a gear slidably mounted thereon in position to engage said rotor driving gear, a spring bearing at one end on an abutment on said shaft and at its other end on said slidable gear, a cylinder having a piston reciprocable therein and operatively connected with said shaft for reciprocating the latter to compress said spring and effect engagement of said gears, a motor having an operative connection for driving said slidable gear, and means for energizing said motor upon movement of said piston to slide said shaft and compress said spring including a control member for said motor operated by said shaft.

8. Hydraulic mechanism for driving the rotor of a rotary wing aircraft to position the blades of the latter for folding including a cylinder, a piston reciprocable in said cylinder, a piston rod having a drive gear slidably mounted thereon, a rotor driving gear in position to be engaged by said drive gear, spring means between said piston and said drive gear for biasing the latter into meshing engagement with said rotor driving gear, a hydraulic rotor for driving said drive gear having means for admitting hydraulic fluid thereto including a valve aligned with said piston rod, and means on the free end of said piston rod for opening said valve to admit fluid to said motor upon movement of said piston in a direction to engage said gears.

9. In a rotary wing aircraft, a rotor, said rotor having a blade thereon, said rotor having a shaft, a first gear fixed for rotation with said shaft, a second gear mounted for slidable movement into and out of meshing contact with said first gear, means for driving said second gear, means for moving said second gear into meshing contact with said first gear, means for starting said means for driving said second gear after said means for moving said second gear into meshing contact with said first gear has moved said second gear towards said first gear for engagement therewith, and means for stopping said means for driving said second gear after said blade has been positioned over a predetermined line.

10. In a rotary wing aircraft, a rotor, said rotor having a blade thereon, said rotor having a shaft, a first gear fixed for rotation with said shaft, a second gear mounted for slidable movement into and out of meshing contact with said first gear, means for driving said second gear, means for moving said second gear into meshing contact with said first gear, means for starting said means for driving said second gear after said means for moving said second gear into meshing contact with said first gear has moved said second gear towards said first gear for engagement therewith, and means for stopping said means for driving said second gear after said blade has been positioned over a predetermined line and for deactivating said means for moving said second gear into meshing contact with said first gear.

11. In a rotary wing aircraft, a rotor, said rotor having a blade thereon, said rotor having a shaft, a first gear fixed for rotation with said shaft, a second gear mounted for slidable movement into and out of meshing contact with said first gear, means for driving said second gear, means for braking said shaft, means for moving said second gear into meshing contact with said first gear, means for starting said means for driving said second gear after said means for moving said second gear into meshing contact with said first gear has moved said second gear towards said first gear for engagement therewith, means for stopping said means for driving said second gear after said blade has been positioned over a predetermined line, and means for actuating said braking means.

12. In a rotary wing aircraft, a rotor, said rotor having a blade thereon, said rotor having a shaft, a first gear fixed for rotation with said shaft, a second gear mounted for slidable movement into and out of meshing contact with said first gear, means for driving said second gear, means for braking said shaft, means for moving said second gear into meshing contact with said first gear, means for starting said means for driving said second gear after said means for moving said second gear into meshing contact with said first gear has moved said second gear towards said first gear for engagement therewith, means for stopping said means for driving said second gear after said blade has been positioned over a predetermined line and for deactivating said means for moving said second gear into meshing contact with said first gear, and means for actuating said braking means.

13. In a rotary wing aircraft, a rotor, said rotor having a blade thereon, said rotor having a shaft, a first gear fixed for rotation with said shaft, a second gear mounted for slidable movement into and out of meshing contact with said first gear, means for driving said second gear, means for braking said shaft, means for moving said second gear into meshing contact with said first gear, means for starting said means for driving said second gear after said means for moving said second gear into meshing contact with said first gear has moved said second gear towards said first gear for engagement therewith, means for stopping said means for driving said second gear after said blade has been positioned over a predetermined line and for deactivating said means for moving said second gear into meshing contact with said first gear, and means for actuating said braking means and for moving said second gear out of engagement with said first gear.

14. In a rotary wing aircraft, a fuselage, a rotor having at least one blade, brake means for said rotor, first means drivingly connected with said rotor, second means for driving said rotor, third means located between said first and second means for connecting and disconnecting said first and second means, first control means for applying said brake means and holding said third means so that said second means is disconnected from said first means, and second control means for releasing said brake means and holding action of said first control means while connecting said first and second means by said third means and starting said second means for driving said rotor.

15. In a rotary wing aircraft, a fuselage, a rotor having at least one blade, brake means for said rotor, first means drivingly connected with said rotor, second means for driving said rotor, third means located between said first and second means for connecting and disconnecting said first and second means, first control means for applying said brake means and holding said third means so that said second means is disconnected from said first means, second control means for releasing said brake means and holding action of said first control means while connecting said first and second means by said third means and starting said second means for driving said rotor, and third control means for stopping said second means for driving said rotor at a predetermined setting of said blade.

16. In a rotary wing aircraft, a fuselage, a rotor having at least one blade, brake means for said rotor, first means drivingly connected with said rotor, second means for driving said rotor, third means located between said first and second means for connecting and disconnecting said first and second means, first control means for applying said brake means and holding said third means so that said second means is disconnected from said first means, second control means for releasing said brake means and holding action of said first control means while connecting said first and second means by said third means and starting said second means for driving said rotor, third control means for stopping said second means for driving said rotor at a predetermined setting of said blade, and fourth control means for reversing the rotation of said second means for driving said rotor in its other direction.

17. In a rotary wing aircraft, a fuselage, a rotor having at least one blade, brake means for said rotor, first means drivingly connected with said rotor, second means for driving said rotor, third means located between said first and second means being movable between one position connecting said first and second means and a position disconnecting said first and second means, first control means for applying said brake means and holding said third means in said position disconnecting said first and second means, and second control means for releasing said brake means and holding action of said first control means while placing said third means in said position connecting said first and second means and starting said second means for driving said rotor.

18. In a rotary wing aircraft, a fuselage, a rotor on said fuselage, said rotor having a blade thereon, brake means for holding said rotor against rotation in any position, first means operatively connected to said rotor for rotating said rotor, drive means on said aircraft for driving said first means, said first means having means engageable by said drive means for rotating said rotor, said drive means having means engageable with said engageable means of said first means, means operatively connected to said brake means for applying said brake means, holding means operatively connected to said engaging means of said drive means for holding it out of engagement with the engageable means of said first means, means operatively connected to said brake means for releasing said brake means, and means operatively connected to said engaging means of said drive means for engaging it with the engageable means of said first means.

19. In a rotary wing aircraft, a fuselage, a rotor on said fuselage, said rotor having a blade thereon, brake means for holding said rotor against rotation in any position, first means operatively connected to said rotor for rotating said rotor, drive means on said aircraft for driving said first means, said first means having a first gear engageable by said drive means for rotating said rotor, said drive means having a second gear engageable with said first gear of said first means, means operatively connected to said brake means for applying said brake means, holding means operatively connected to said second gear of said drive means for holding it out of engagement with the first gear of said first means, means operatively connected to said brake means for releasing said brake means, and means operatively connected to said second gear of said drive means for engaging it with the first gear of said first means.

References Cited in the file of this patent

UNITED STATES PATENTS

| | | |
|---|---|---|
| 2,518,008 | Herrick | Aug. 8, 1950 |
| 2,771,143 | Campbell | Nov. 20, 1956 |